Sept. 16, 1952 R. O. HULBERT 2,610,750
MOTOR VEHICLE WHEEL TRUCK
Filed Oct. 1, 1948 2 SHEETS—SHEET 1
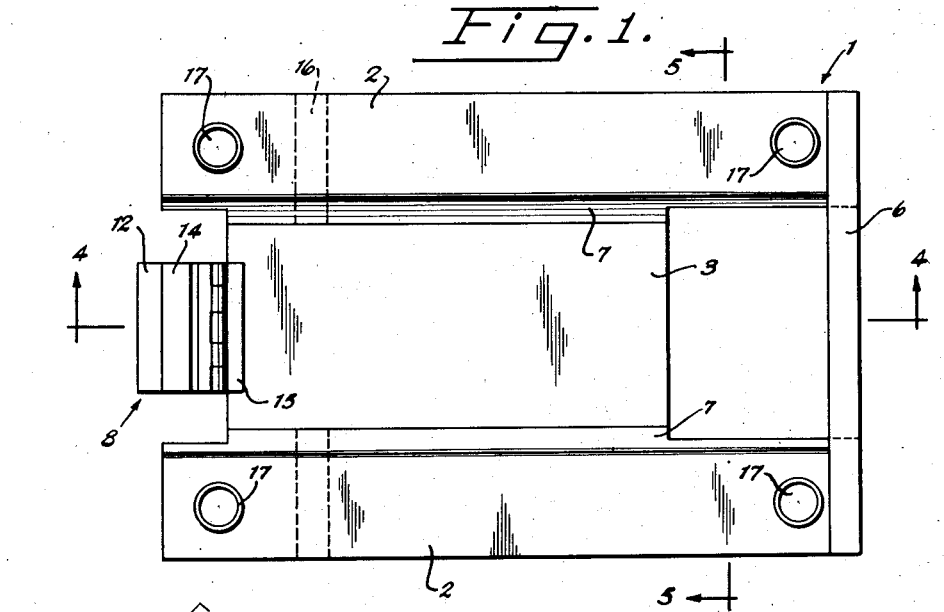
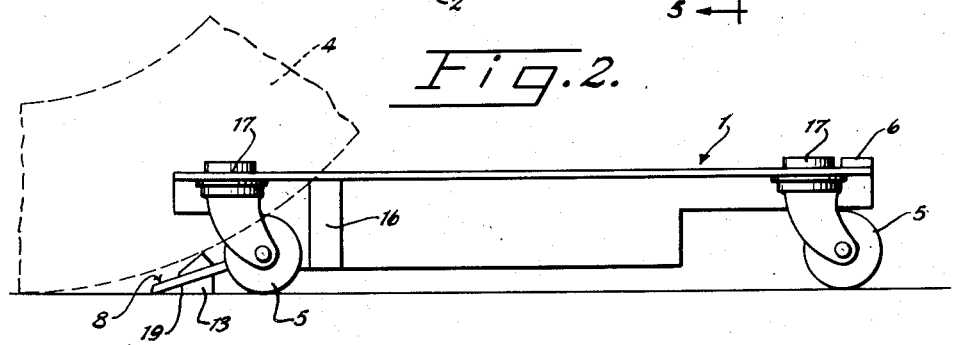
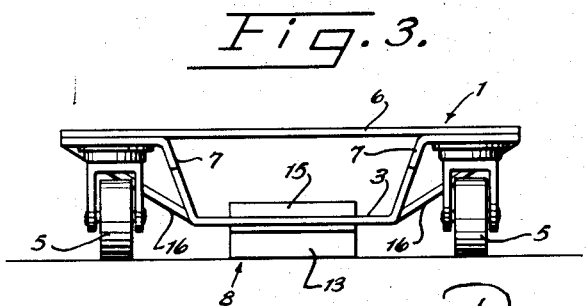
Inventor
Reed O. Hulbert
By Albert H. Kirchner

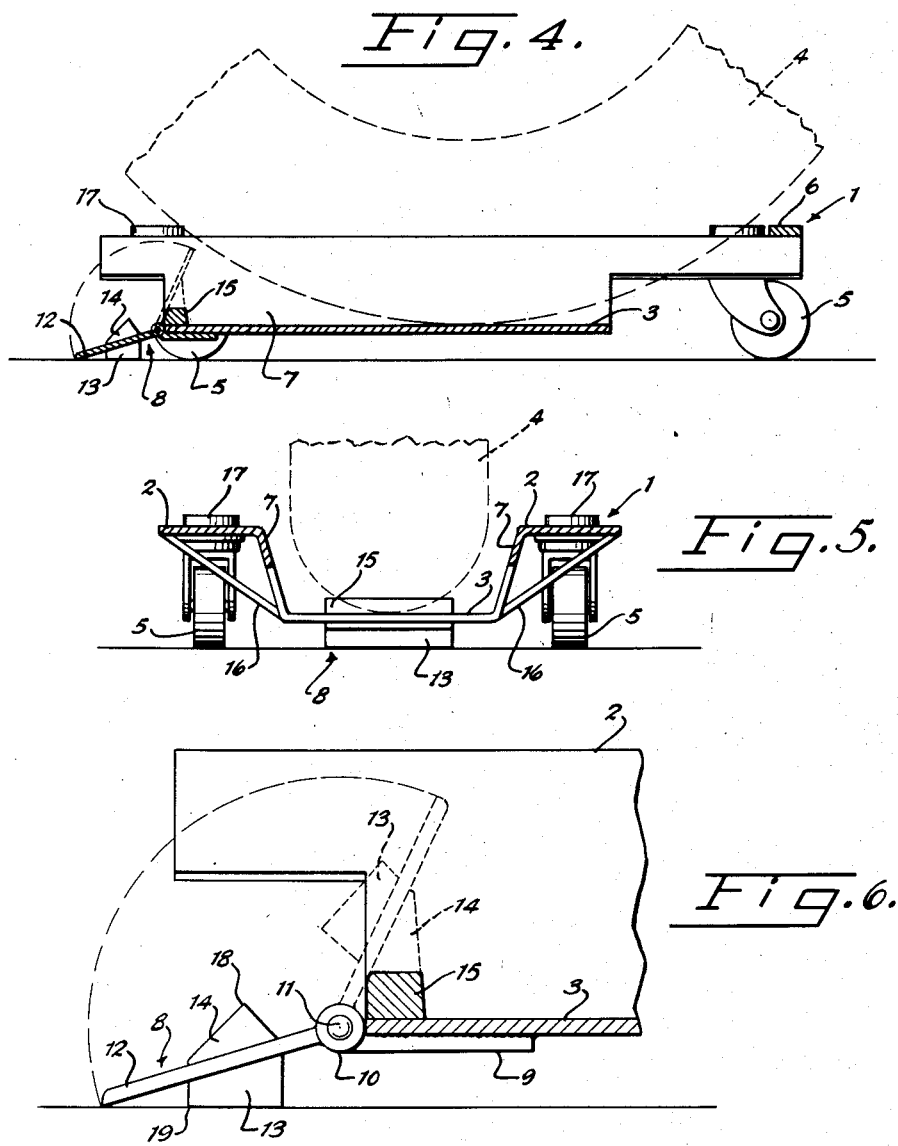

Patented Sept. 16, 1952

2,610,750

UNITED STATES PATENT OFFICE 2,610,750

MOTOR VEHICLE WHEEL TRUCK

Reed O. Hulbert, Ashtabula, Ohio

Application October 1, 1948, Serial No. 52,305

13 Claims. (Cl. 214—85)

The present invention relates to wheel trucks for motor vehicles and the like.

More particularly, the invention provides a low, wheeled carriage for individually supporting one of the wheels of a road vehicle, such as an automobile or a motor truck, so that the wheel thus supported, and the vehicle on which it is mounted, may be moved short distances in a shop, parking garage or the like, in any direction without rotation of the vehicle wheel.

The trucks contemplated by the invention are intended to be used in sets of two or four, with each truck supporting a single wheel of the vehicle, so that a vehicle thus mounted can be rolled in any direction, including direct sidewise movement, for facilitating stowing it in a parking space or moving it across the floor of a repair shop.

Important objects of the invention are to provide a truck of the character indicated which will be simple in construction and inexpensive to manufacture, which will be strong and durable so as to withstand the heavy loads imposed on it by large vehicles and the rough treatment common in repair shops, parking garages and the like, that will be light in weight and easily handled, that will be simple to operate, to receive and discharge a vehicle by running the same onto and off the truck and, most importantly, which will include means for holding the vehicle wheel captive on the truck against all pulling and pushing forces which may be applied to the vehicle to roll it while mounted on the truck or a set of trucks.

The latter feature of the invention comprises use of a combination ramp and holding member which in one position guides the vehicle wheel up onto the bed of the truck carriage and which in another position locks the wheel of the carriage. An important feature of this combination member is the ease with which it may be moved between its two positions so that it is an extremely simple matter to prepare the truck to receive the vehicle wheel or to lock the wheel in place on the truck or to prepare the truck so that the wheel may be rolled back off it.

The truck is provided with rolling means, which are preferably casters mounted on its under side. Since the trucks are usually used in pairs or in sets of four, it is desirable to form them in a way that will permit neat and secure stacking of a plurality of them comprising a set. The structure provided by the present invention includes novel and effective stacking elements by which the several trucks of a set may be superposed on each other neatly and securely against any tendency to become accidentally displaced.

Other objects are concerned with providing adequate traction between the truck ramp and the tire of a vehicle, and between the ramp and the floor on which it is used, so as to keep the truck from rolling forwardly away from a wheel which is sought to be rolled up onto it and from rolling back with a wheel which is sought to be rolled back off it.

With the foregoing and other features and advantages in contemplation, a preferred embodiment of the invention is constructed in accordance with the illustrations comprising the accompanying drawing, in which Figure 1 is a top plan view;

Fig. 2 is a side elevational view showing the combination ramp and holding member in position to receive a vehicle wheel which is being rolled up onto the bed of the truck.

Fig. 3 is a front elevational view, taken from the right hand side of Fig. 1;

Fig. 4 is a longitudinal central sectional view, taken on the line 4—4 of Fig. 1, showing a vehicle wheel in place on the truck, with the combination ramp and holding member shown in full lines in its position for guiding the wheel onto or off the truck and shown in broken lines in its position for holding the wheel on the truck;

Fig. 5 is a transverse cross-sectional view taken on the line 5—5 of Fig. 1, showing the vehicle wheel in place on the truck;

Fig. 6 is a relatively enlarged detail longitudinal sectional view of the rear end portion of the truck showing in full and broken lines the two terminal positions of the combination ramp and holding member; and Fig. 7 is a relatively enlarged detail sectional view of a side rail of the truck showing one of the stacking elements.

Generally speaking, the invention comprises a small carriage provided with rolling supports such as casters and including a bed for mounting a vehicle wheel and having at one end fixed means for keeping the wheel from rolling off the truck and at its other end a movable element for holding the wheel on the truck or serving as a ramp over which the wheel can be run onto or off the truck.

In the drawings, reference numeral 1 designates a generally trough-shaped body, best made integrally of steel or some lighter metal, comprising a pair of parallel longitudinal side rails 2 and a depressed central bed 3 which is wide enough and long enough to accommodate the tire or wheel 4 of a vehicle. The length of the carriage, like its width, is not critical, as long as both dimensions are adequate to receive any tire or wheel 4 (hereinafter called simply a wheel) within the range of sizes with which the truck is to be used.

The carriage is mounted with its bed 3 elevated above the floor sufficiently to be moved over the floor and in order to provide for this elevated position and the ability to be rolled, the carriage is equipped with wheels or the equivalent. I prefer to employ swivelled casters 5, one positioned at each of the four corners of the structure as by having their bases welded or otherwise strongly attached to the under side of the side rails 2.

One end of the carriage, which may be regarded as its front end, shown at the right hand side of Fig. 1, may be braced and closed by a stout cross bar 6 welded to the upper surfaces of the end portions of the side rails 2. This bar serves as a stop for keeping the vehicle wheel 4, after it is positioned on the bed 3, from rolling off the front end of the carriage, as will be evident from Fig. 4. It serves also to brace and strengthen the front end of the carriage and it permits a portion of the front end of the bed 3 and of the side walls 7, 7 which connect the bed with the side rails to be cut out and removed to decrease the weight of the structure. It will be observed from Fig. 4 that this cut-out is short enough in the lengthwise direction of the structure to leave the bed 3 long enough to support the wheel 4.

The opposite end of the carriage, which may be regarded as its rear end, shown at the left hand side of Figs. 1, 2, 4 and 6, is provided with means serving the combined functions of a ramp for guiding the wheel 4 up onto the bed and permitting it to be rolled back therefrom and, when the means is moved to another position, to hold the wheel on the bed, thus cooperating with the bar 6 and the side rails 2, 2 to maintain the wheel in the four-sided pocket or closed-end trough formed by the side rails, the bar, and the combination ramp and holding means.

This combination member, generally designated 8, comprises a stout metal hinge of the fast-pin butt type, having one of its leaves or plates 9 welded to the under side of the bed 3, with its eyes 10 which hold the pin 11 butted against the transverse end edge of the bed 3 and with the cooperating leaf or plate 12 movable to the downwardly inclined position shown in full lines in Fig. 6 and swingable therefrom about the pivot pin 11 to the elevated position shown in broken lines in that figure.

The member 8 need not be as wide as the bed 3, and the bed may be cut back at its rear end, somewhat in the manner in which the front end is cut back, as best shown in Figs. 1 and 6, so that the movable plate 12 of the member is largely encased within the over-all length of the carriage. A hinge of the relative width shown in Fig. 1 has been found wide enough to give good support to the tire of a wheel 4 when rolled centrally over it, as suggested by Fig. 5.

The plate 12 of the combination member has welded or otherwise attached to its under surface a block 13, shaped and proportioned to present a square or flat surface that will rest on the floor when the plate 12 is lowered and its free edge rests on the floor. Thus the plate 12 is adequately supported for withstanding the weight of the vehicle wheel rolling over it.

The upper surface of the plate 12 has welded to it a block 14 of triangular cross section, as best shown in Fig. 6. This block is low enough to offer no appreciable obstruction to a wheel 4 of the smallest size which the truck is to handle. Its function is to serve as a limiting stop for fixing the angle of the plate 12 when swung to its upturned position as shown in broken lines in Fig. 6. In this position the block 14 seats on a block 15 which is welded across the rear margin of the upper surface of the bed 3. The proportions of the two blocks are such that when the block 14 is engaged with the top of the block 15, as shown in broken lines in Fig. 6, the plate 12 will make with the bed 3 an acute angle which is small enough to cause the plate 12 to obstruct the wheel 4, positioned on the bed 3, and keep the wheel from rolling back off the bed.

It will be recognized that the value of this angle is of some importance. On purely theoretical considerations it is probable that the angle should be such that the plane of the upraised leaf 12 should pass slightly below the center of curvature of the wheel 4. However, I have found that in actual practice the angle need not be so acute. Apparently the angle can be larger because of the yieldability of the rubber tire with which the wheel 4 is almost invariably equipped, and probably also because of the coefficient of friction between the rubber of the tire and the metal of the plate 12. In other words, when the tire tends to roll back against the upturned plate, the plate seats itself in a depression which it forms in the tire, and this depressed engagement, along with the friction of the rubber on the metal, effectively keeps the plate 12 from swinging down and permitting the tire to roll back off the bed. I have found that an angle of 65° between the bed 3 and the upturned plate 12 is entirely satisfactory. Hence, I specify that this angle should be substantially 65°, more or less, but of course any angle which is small enough to keep the plate from being pushed back down to its ramp position and great enough to keep the wheel from rolling over the upturned plate is correct and within the principle of the invention.

Of course it is the position and size of the blocks 14 and 15 which determine the angle in question. While this determination could be effected theoretically by a single block formed on the upper surface of the plate 12, without a cooperating block 15 secured to the bed 3, I prefer to employ the combination of the two blocks 14 and 15. This division of the blocking members enables me to make the block 14 in a size which will not interfere appreciably with the rolling of the wheel 4 over the ramp. It also enables me to locate the block 14 farther away from the hinge pin 11, so that there is less leverage about this pin and less strain imposed on it and on the eyes 10 by any force or blow which may be directed against the edge of the upturned plate 12 tending to move it from left to right, as seen in Fig. 6. The size of the block 15, like that of the block 14, is not great enough to interfere appreciably with rolling the wheel 4 over it.

To strengthen the rear end portion of the carriage, a pair of braces 16 may be welded to the edges of the side rails 2 and to the adjacent side edges of the bed 3, thus securely trussing the rear portion of the carriage and making it as strongly braced as the front end portion is by the bar 6.

As has been stated hereinabove, the carriage is provided with means for facilitating stacking a set of the trucks in superposed relation. This means may comprise a shallow well or pocket formed by a low cylinder or ring 17 welded or otherwise secured to the top surface of each of the side rails 2 directly above each of the caster bases so that each caster of a truck may be set in the corresponding well or pocket of another truck and thus kept from rolling off the supporting truck.

In use, the leaf or plate 12 constituting the combination ramp and locking member is lowered and placed in front of a wheel 4 as shown in Fig. 2 and the vehicle is rolled up the ramp and onto the bed 3. Generally at least two trucks are used simultaneously, for both of the front wheels or both of the rear wheels of a vehicle, and frequently four trucks are used simultaneously so as to support all the wheels of the vehicle. When two trucks are employed, the vehicle can easily be swung pivotally about a point more or less central of its unsupported end. When four trucks are used the vehicle can be rolled in any direction, including straight sidewise directions.

With the vehicle wheel 4 rolled forward on the bed 3 until it more or less engages the front bar 6, the plate 12 is raised to its broken line position in Fig. 6, in which position it securely holds the wheel 4 in place. Rearward rolling of the wheel is prevented because the upturned free end of the plate becomes engaged by the tire of the wheel and because the angle which the plate makes with the periphery of the tire is such that pressure from the tire will tend to press the block 14 against the block 15 and not to swing the plate back to its full line position of Fig. 6.

The plate can be kicked up very readily by the foot of an operator and can be kicked down just as easily.

When a vehicle wheel is being rolled up the ramp the truck is kept from moving forwardly by engagement of the uppermost corner 18 of the block 14 with the tire of the wheel. This corner seats itself in the relatively soft tire tread, thus acting as a cleat which gives traction to the wheel and keeps the ramp and the truck from being squeezed out or pushed forward ahead of the wheel. Thus it is unnecessary to anchor the truck on the floor when a vehicle is to be rolled onto it.

When a vehicle wheel is being rolled back off the bed there is some tendency for the truck to roll back with the vehicle. However, this tendency is entirely offset and backward rolling of the truck is prevented by the rear corner 19 of the block 13 which tends to bite into the floor or to seat itself against any slight irregularity in the floor surface. Thus the floor offers enough resistance to backward rolling of the truck to permit the wheel 4 to roll up over the bar 15 without pushing the truck back, so that it is unnecessary to anchor the truck onto the floor when a vehicle is to be rolled off it.

From the foregoing it is believed that the structure, uses and advantages of the invention will be evident to those skilled in the art. It is to be understood that, as explained hereinabove, the illustrated embodiment is simply one form which the invention may take, although it is the presently preferred form which I have used in actual practice with entire satisfaction, and that the invention may be otherwise embodied within the scope of the appended claims without departing from the inventive principles.

I claim:

1. In a motor vehicle wheel truck, a wheeled carriage body having a horizontal bed for supporting a vehicle wheel, and a ramp having an extreme end edge hinged to one end of the bed and having on its upper surface block means including a portion carried by the upper surface of the ramp adapted, when the ramp is swung upwardly, to engage the bed and thereby limit said swinging movement to a position of the ramp in which it overhangs the bed and makes with the bed an acute angle small enough for the free end of the ramp to be depressed into the tread surface of the vehicle wheel and thereby obstruct rolling of the vehicle wheel back off the bed.

2. In a motor vehicle wheel truck, a wheeled carriage body having a horizontal bed for supporting a vehicle wheel, and a ramp having an extreme end edge hinged to one end of the bed and having on its under surface a block for supporting the ramp in a position upwardly inclined to the bed and having on its upper surface a block adapted, when the ramp is swung upwardly, to limit said swinging movement to a position of the ramp in which it overhangs the bed and makes with the bed an acute angle small enough for the free end of the ramp to be depressed into the tread surface of the vehicle wheel and thereby obstruct rolling of the vehicle wheel back off the bed.

3. In a motor vehicle wheel truck, a wheeled carriage body having a horizontal bed for supporting a vehicle wheel, a block mounted on one end portion of the bed, a ramp having an extreme end edge hinged to said end portion of the bed, and a block mounted on the upper surface of the ramp adapted, when the ramp is swung upwardly, to engage said bed block and limit the ramp to a position in which it overhangs the bed and makes with the bed an acute angle small enough for the free end of the the ramp to be depressed into the tread surface of the vehicle wheel and thereby obstruct rolling of the vehicle wheel back off the bed.

4. In a motor vehicle wheel truck, a wheeled carriage body having a horizontal bed for supporting a vehicle wheel, a block mounted on one end portion of the bed, a ramp having an extreme end edge hinged to said end portion, a block mounted on the under surface of the ramp for supporting the ramp in a position upwardly inclined to the bed, and a block mounted on the upper surface of the ramp adapted, when the ramp is swung upwardly, to engage said bed block and limit the ramp to a position in which it overhangs the bed and makes with the bed an acute angle small enough for the free end of the ramp to be depressed into the tread surface of the vehicle wheel and thereby obstruct rolling of the vehicle wheel back off the bed.

5. In a motor vehicle wheel truck, a wheeled carriage body having a horizontal bed for supporting a vehicle wheel, a bar disposed across one end of the bed, a block mounted on the other end portion, a ramp having an extreme end edge hinged to said end portion, a block mounted on the under surface of the ramp for supporting the ramp in a position upwardly inclined to the bed, and a block mounted on the upper surface of the ramp adapted, when the ramp is swung upwardly, to engage said bed block and stop the ramp at a position in which it overhangs the bed and makes with the bed an acute angle small enough for the free end of the ramp to be depressed into the tread surface of the vehicle wheel and thereby keep the vehicle wheel from rolling back off the bed.

6. A motor vehicle wheel truck including a wheeled carriage, a ramp plate having an extreme end plate hinged to one end of the carriage and adapted to be lowered to engage its free end with the floor supporting the truck, a block secured to the under side of the ramp plate for supporting the same on the floor and having an edge adapted to make biting contact with the floor to prevent undesired backward movement of the truck when a vehicle wheel is being rolled off the carriage, and a block secured to the upper surface of the ramp plate adapted to provide traction for a vehicle wheel which is being rolled up onto the carriage and prevent undesired forward movement of the truck.

7. A motor vehicle wheel truck comprising a carriage, a plurality of casters mounted on the under side of the carriage for supporting the same for rolling on a floor or the like, and the upper surface of the carriage being provided with a plurality of pockets for receiving the casters of a superposed truck stacked thereon.

8. A motor vehicle wheel truck comprising a carriage, a plurality of casters mounted on the under side of the carriage for supporting the same for rolling on a floor or the like, and a plurality of cups mounted on the upper surface of the carriage for receiving the casters of a superposed truck stacked thereon.

9. A motor vehicle wheel truck comprising a wheeled carriage body having a fixed horizontal elevated bed for supporting a vehicle wheel, a ramp having an extreme end edge hinged to one end of the bed and having its free end normally resting on the ground so that a vehicle wheel may be rolled up the ramp and mounted on the bed and being manually swingable about its hinged end, and an abutment for limiting upward swinging movement of the ramp to a raised position in which the ramp overhangs the bed and makes with the bed an acute angle small enough for the free end of the ramp to impinge against the mounted vehicle wheel and thereby obstruct rolling of the wheel back off the bed.

10. A motor vehicle wheel truck as claimed in claim 9 in which the ramp when swung to its raised position overhanging the bed makes with the bed an angle of approximately 65°.

11. A motor vehicle wheel truck as claimed in claim 9 including a bar disposed across the end of the bed opposite the end to which the ramp is hinged, said bar cooperating with the bed and raised ramp to cradle the vehicle wheel on the bed.

12. A motor vehicle wheel truck as claimed in claim 9 in which the ramp when swung to its raised position overhanging the bed makes with the bed an angle of approximately 65° and including a bar disposed across the end of the bed opposite the end to which the ramp is hinged, said bar cooperating with the bar and raised ramp to cradle the vehicle wheel on the bed.

13. A motor vehicle wheel truck comprising a wheeled carriage body having a fixed bed for supporting a vehicle wheel having at one end an elevated wheel-retaining abutment and having at its opposite end a ramp having one extreme end edge hinged to said opposite end of the bed with the other end edge of the ramp adapted to rest on the ground to provide a runway up which the vehicle wheel may be rolled on to the bed, and means limiting upward swinging movement of the ramp to a position in which the ramp overhangs the bed and makes with the bed an acute angle small enough for the free end of the ramp to cooperate with said abutment to hold the vehicle wheel cradled on the bed between said abutment and the free end of the ramp.

REED O. HULBERT.

REFERENCES CITED

The following references are of record in the file of this patent:

UNITED STATES PATENTS

| Number | Name | Date |
| --- | --- | --- |
| 1,482,105 | Andrews et al. | Jan. 29, 1924 |
| 1,536,611 | Duke | May 5, 1925 |
| 1,777,694 | Halteman | Oct. 7, 1930 |
| 2,198,433 | Knapp | Apr. 23, 1940 |
| 2,246,882 | Gentry | June 24, 1941 |
| 2,247,717 | Sutter | July 1, 1941 |
| 2,358,864 | Lockwood | Sept. 26, 1944 |
| 2,414,383 | Merriam | Jan. 14, 1947 |
| 2,443,480 | Schwitzer et al. | June 15, 1948 |
| 2,452,356 | Coit, Jr. | Oct. 26, 1948 |
| 2,463,744 | Clemens | Mar. 8, 1949 |

FOREIGN PATENTS

| Number | Country | Date |
| --- | --- | --- |
| 655,912 | France | Dec. 22, 1928 |